May 3, 1938.  S. J. GWIDT  2,116,023
AERATOR
Filed Dec. 31, 1936  2 Sheets-Sheet 2

Inventor
S. J. Gwidt
By
Attorney.

Patented May 3, 1938

2,116,023

UNITED STATES PATENT OFFICE 2,116,023

AERATOR

Stanislous J. Gwidt, Rhinelander, Wis.

Application December 31, 1936, Serial No. 118,699

2 Claims. (Cl. 261—87)

This invention aims to provide a simple but effective means for delivering air into a body of water, such as a lake or stream, in order to supply fish with air, especially when the body of water is frozen over, although the device may be used at any season of the year, and whenever water becomes stagnant. The invention aims to provide a unitary driving means for compressing and discharging the air, and for putting the aerated water into motion, thus producing in water that would otherwise be at rest, the beneficial effect extended in nature by the flow of a stream through rapids.

It is within the province of the disclosure to improve generally and to enhance the utility of devices of that type to which the present invention appertains.

With the above and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Figure 1:
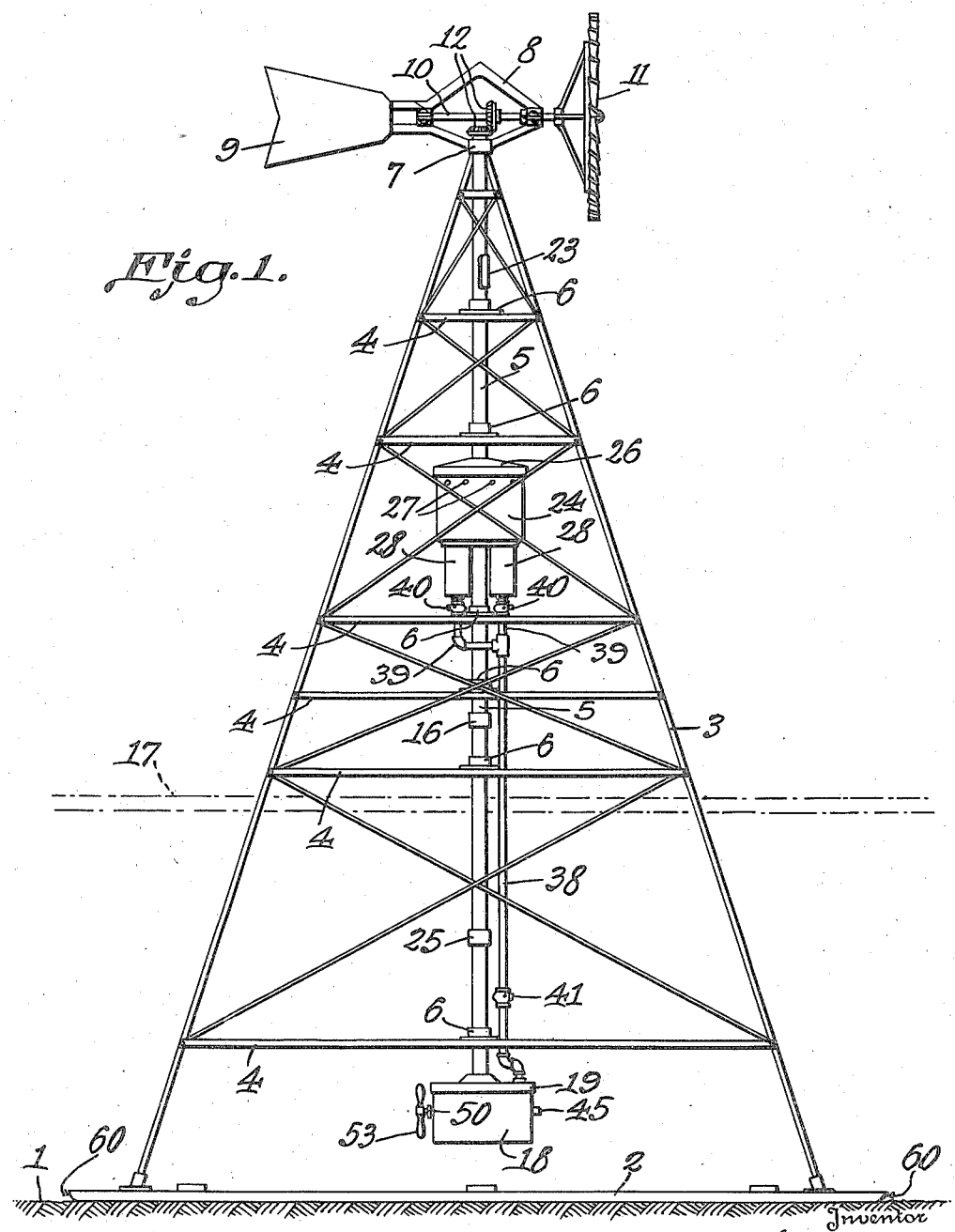
Fig. 1 shows in elevation, a device constructed in accordance with the invention, mounted on the bed of a body of water.

The numeral 1, in Fig. 1, marks the bed of a lake, stream, or other body of water. The numeral 2 designates a base resting on the bed 1. The base 2 may be beveled at its ends, as shown at 60, or otherwise constructed, so that the machine may be moved from place to place, as on skids, if the operator does not wish to maintain it in a fixed position.

Figure 2:
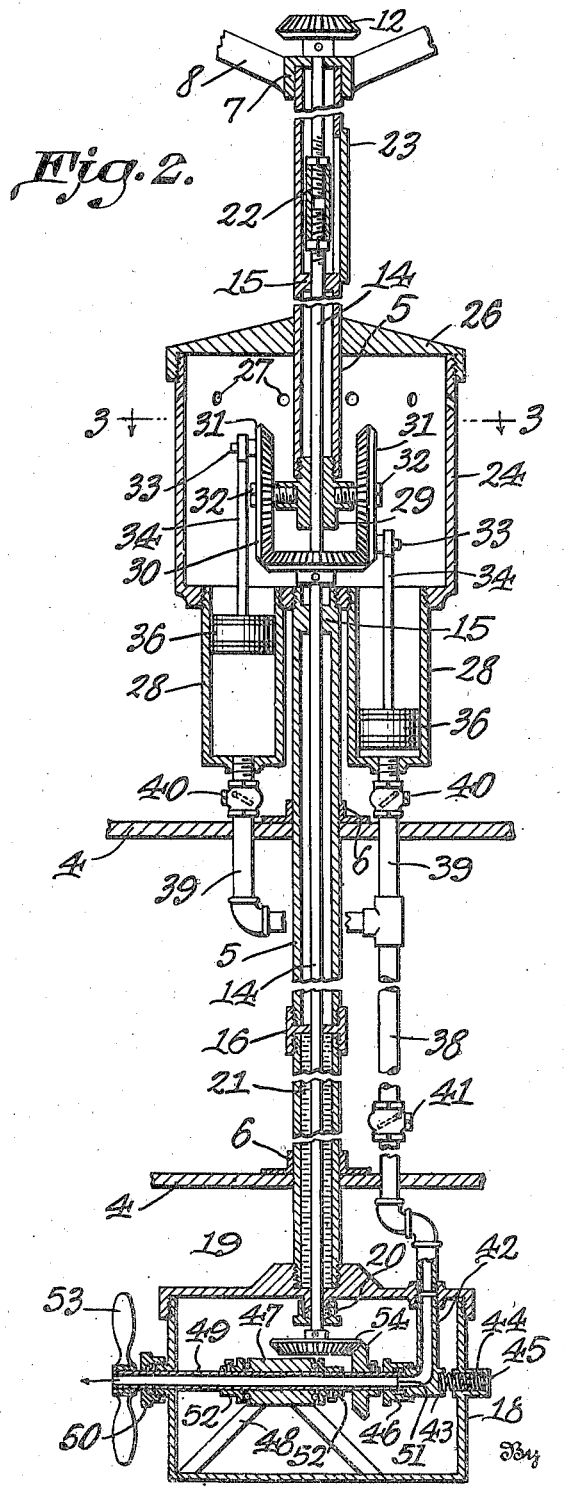
Fig. 2 is an enlarged, vertical longitudinal section wherein parts are broken away.
Figure 3:
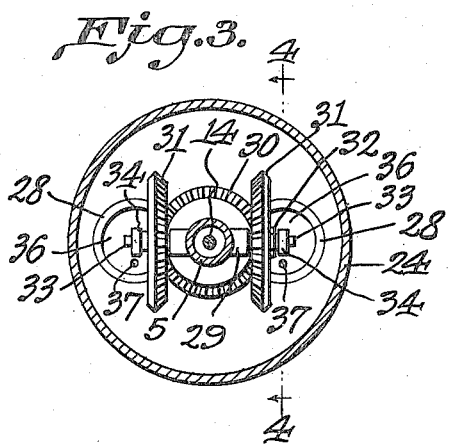
Fig. 3 is a horizontal cross section on the line 3—3 of Fig. 2.

A tower 3 is secured to the base 2 and embodies a plurality of horizontal platforms 4. Through the platforms 4 passes a pipe 5 which constitutes a housing for the driving shaft 14, hereinafter mentioned. The pipe 5 of course may consist of as many sections as desired, united by couplings 25 (Fig. 1). Referring to Fig. 2, it will be seen that the pipe or housing 5 comprises vertically spaced upper and lower parts, connected by means to be described further on.

The housing 5 supports many parts of the operating mechanism, and in order that the housing may be prevented from slipping downwardly, collars 6 are attached to it, these collars having a footing on the platforms 4, as Fig. 2 will show.

Although any suitable driving means may be supplied, a windmill will answer the purpose. With that end in view, an inverted cup-shaped socket 7 is mounted to rotate upon the upper end of the housing 5 and carries a frame 8, provided at one end with a vane 9. In the frame 8, a horizontal driven shaft 10 is journaled, a wind wheel 11 being secured to the shaft. As has been intimated hereinbefore, the wind wheel 11 and associated parts may be supplanted by any desired prime mover.

Intermeshing beveled gears 12 are shown as connecting the intermediate portion of the drive shaft 10 with a vertical driven shaft 14, which extends downwardly through the housing 5. The driven shaft 14 is journaled in the socket 7, and in any desired number of bearings 15 carried by the housing 5. The shaft 14 may be journaled also in a specially constructed coupling 16, interposed in the pipe or housing 5. The coupling 16 is located well above the plane in which the ice 17 (Fig. 1) forms on the stream.

A housing 18 is located near to the bed 1 of the body of water, slightly above the base 2. The housing 18 embodies a detachable lid 19, having a packing gland 20, wherein the driven shaft 14 is journaled. The space within the housing 5 (Fig. 2) between the lid 19 of the housing 18 and the coupling 16 forms a container 21 for oil or any other anti-freezing liquid.

In order to make the driven shaft 14 adjustable as to length, it may be formed in two axially aligned parts, as Fig. 2 will make manifest, those parts being united by a threaded coupling 22 or otherwise. In order that access may be had readily to the coupling 22, the free portion of the housing 5 may be supplied with a door 23.

The numeral 24 designates a casing, having a detachable lid 26, through which the upper portion of the housing 5 extends. The upper end of the lower portion of the housing 5 is secured in the bottom of the casing 24. The casing 24 has openings 27, for the admission of air.

The upper ends of air pump cylinders 28 are secured in the bottom of the casing 24, the cylinders preferably being disposed on opposite sides of the housing 5. In the lower end of the upper portion of the pipe or housing 5 (Fig. 2) a bearing 29 is mounted, and therein the driven shaft 14 is journaled. A horizontal beveled gear 30 is secured to the driven shaft 14, within the casing 24 and is located near to the bottom of the casing. The beveled gear 30 meshes with vertical beveled gears 31, disposed on opposite sides of the bearing 28 and journaled thereon as indicated at 32.

Figure 4:
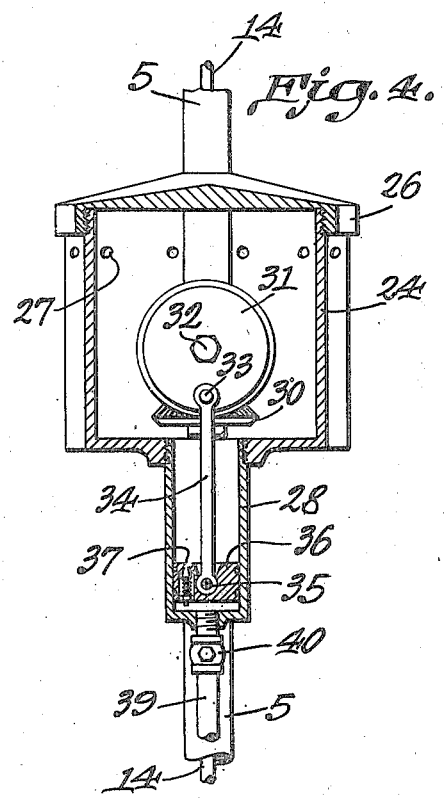
Fig. 4 is a vertical section on the line 4—4 of Fig. 3.

The vertical beveled gears 31 are supplied with wrist pins 33, whereon are pivoted the upper ends of downwardly extended pitmans 34. The lower ends of the pitmans 34 (Fig. 4) are pivoted at 35 to pistons 36 mounted to reciprocate in the cylinders 28, the pistons being supplied with check valves 37, which close when the pistons move downwardly to make a compression stroke.

At 38 there is shown a vertical air delivery pipe, provided with branches 39 connected to the lower heads of the cylinders 28, and in communication with the cylinders. Check valves 40 are interposed in the branches 39 of the air delivery pipe 38 and open away from the cylinders 28. A check valve 41 is interposed in the pipe 38 and is located near the housing 18, as Fig. 1 will disclose. The check valve 41 closes upwardly.

Passing to Fig. 2 it will be noted that the lower end of the air delivery pipe 38 is mounted in the lid 19 of the housing 18. An elbow 42 is located within the housing 18 and has its upper end mounted in the lid 19, the elbow constituting a continuation of the air delivery pipe 38. The elbow 42 has a heel 43, against which abuts the inner end of a compression spring 44, the outer end of the spring being received in a socket 45 on the housing 18. On the inner end of the horizontal portion of the elbow 42 is mounted a packing gland 46.

A bearing 47 lies within the housing 18 and may be supported from the bottom of the housing on a frame 48. The tower 3, the pipe 5 and the housing 18 form a support, whereon a tubular horizontal shaft 49 is mounted to rotate, and, more specifically, the shaft is journaled for rotation in the bearing 47 and in an external gland 50 on the housing 18. Intermeshing beveled pinions 54 form a driving connection between the lower end of the shaft 14 and the shaft 49. The inner end of the tubular shaft 49 is journaled in the gland 46 of the elbow 42, and there is a ground joint 51 at the place where the inner end of the shaft 49 abuts against the elbow. The shaft 49 is held in the bearing 47, against appreciable longitudinal movement, by anti-friction thrust collars 52, secured to the shaft and cooperating with the bearing 47. A propeller 53 is secured to the shaft 49, externally of the housing 18, the shaft opening through the axis of the propeller, as depicted in Fig. 2.

The wear at the ground joint 51 does not amount to more than a few thousandths of an inch in a long time, and by the time that such wear occurs, the thrust collars 52 will have been subjected to a corresponding amount of wear, and the thrust of the propeller 53 to the right in Fig. 2 will take up the wear at the ground joint 51 and keep it tight. Although the upper end of the elbow 42 is shown mounted in the lid 19 of the housing 18, that mounting, like any similar mounting, is not absolutely rigid and the compression spring 44 will tend to thrust the horizontal part of the elbow to the left in Fig. 2, through the very small distance necessary to aid in keeping the joint 51 tight. Practically considered, the joint 51 remains airtight without attention.

Although the shaft 14 may be driven by any desired instrumentality, the vane 9 heads the wheel 11 into the wind, the wheel 11 rotates the drive shaft 10, and rotation is imparted to the driven shaft 14 by way of the beveled gears 12. When the shaft 14 is rotated, the horizontal beveled gear 30 on the shaft rotates the vertical beveled gears 31, the pitmans 34 are actuated, and the pistons 36 are reciprocated in the pump cylinders 28.

Air enters the casing 24 through the openings 27. On the upstroke of the pistons 36, the air passes through the pistons by way of the check valves 37, and on the downstroke of the pistons 36, the air is compressed in the lower portions of the cylinders 28.

The compressed air passes the downwardly opening check valves 40 and moves through the branches 39 into the air delivery pipe 38, the air traversing the elbow 42 and the tubular shaft 49. The air is discharged through the outer end of the shaft 49, as shown by the arrow in Fig. 2. If it be supposed that the shaft 49 is rotating, the propeller 53 will drive forward the aerated water, and the body of water below the ice 17, or in a stagnant pool, will be charged with air sufficiently to promote the welfare of the fish in the water.

As to the manner in which the shaft 49 is rotated, Fig. 2 shows that this end is accomplished by the intermeshing beveled pinions 54 which connect the lower end of the driven shaft 14 with the tubular propeller shaft 49.

The housing 18 is airtight, but some water may leak into it, due to wear or long continued use. Should water accumulate in the housing 18, the upward flow of the water in the pipe 38 will be stopped by the check valve 41. Similarly, should the gland 20 of Fig. 2 leak, the oil or other antifreezing liquid in the container 21 will prevent the upward movement of water in the tubular pipe housing 5. The water, therefore, will not rise to the ice level 17 and freeze either in the air delivery pipe 38 or in the tubular housing 5.

The device is of simple construction, and will operate in a satisfactory way, for a long time, without expert attention. It will deliver air through the tubular shaft 49 into the water, the aerated water will be advanced by the propeller 53, and the fish in the water will be afforded an ample supply of air.

Having thus described the invention, what is claimed is:

1. In a device for aerating water, a support, a substantially horizontal tubular shaft mounted to rotate on the support, a water propeller secured to the shaft, a substantially vertical shaft mounted to rotate on the support, means for connecting the shafts operatively, an air pump on the support, means for conducting air from the pump to the hollow shaft, means for connecting the pump operatively with the substantially vertical shaft, and a motor on the support, the motor driving the substantially vertical shaft, the propeller and the tubular shaft being positioned beneath the surface of the water to be aerated.

2. In a device for aerating water, a support, a substantially horizontal tubular shaft mounted to rotate on the support, a water propeller secured to the shaft, a substantially vertical shaft mounted to rotate on the support, means for connecting the shafts operatively, an air pump on the support, means for conducting air from the pump to the hollow shaft, means for connecting the pump operatively with the substantially vertical shaft, and a wind wheel journaled on the support and connected operatively to the substantially vertical shaft, the propeller and the tubular shaft being positioned beneath the surface of the water to be aerated.

STANISLOUS J. GWIDT.